Patented Oct. 30, 1934

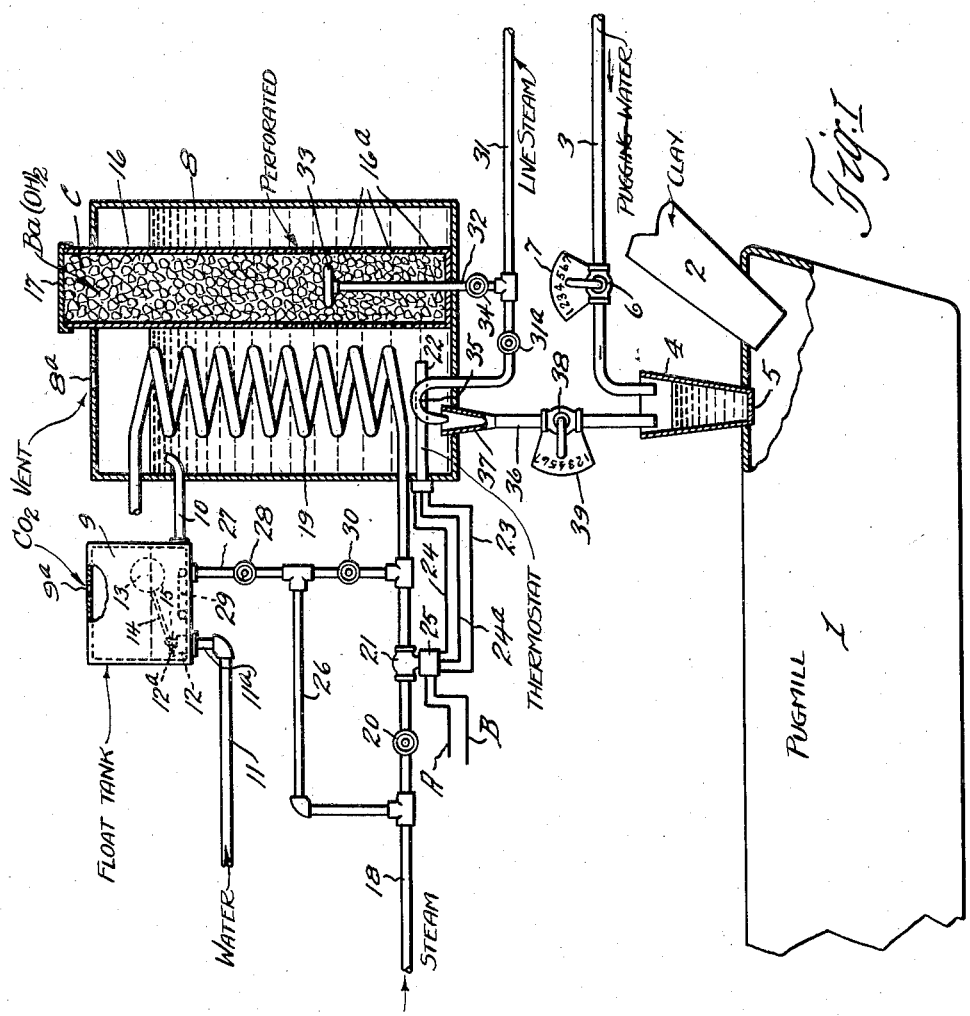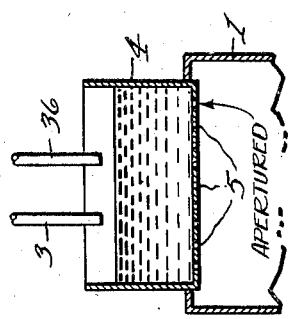

1,978,536

UNITED STATES PATENT OFFICE 1,978,536

APPARATUS FOR PRODUCING SOLUTIONS

William R. Jeavons, Cleveland Heights, and Mahlon J. Rentschler, Willoughby, Ohio Original application May 11, 1928, Serial No. 277,029, now Patent No. 1,808,231. Divided and this application April 29, 1931, Serial No. 533,862

5 Claims. (Cl. 23—285)

This invention relates to an apparatus for the treatment of clay and for the purpose of preventing the formation of scum on brick or other ware formed therefrom, this application being a division of our application No. 277,029, filed May 11, 1928 now matured into Patent No. 1,808,231.

The scumming or efflorescence as commonly observed on building bricks and tiles is caused by the deposition of soluble salts (usually $MgSO_4$ and $CaSO_4$) on the surfaces thereof. These salts are usually contained in the clay from which the brick or other ware is made, as well as, to a considerable extent, in the water used for mixing or pugging the clay. Moisture due to weathering dissolves these salts and brings them to the surface of the bricks and tiles, resulting in the production of the undesirable and unsightly scum formation referred to.

It is the object of our invention to provide an apparatus for the treatment of clay which will enable the conversion of the soluble sulphates into insoluble barium sulphates to be accomplished in a convenient, effective and economical manner. We accomplish these objects and other and more limited objects which will appear hereinafter in and through the construction shown in the drawing wherein Fig. 1 represents a diagrammatic sectional elevation of an apparatus or system for realizing our invention; and Fig. 2 a detail in vertical section through the receptacle by which the pugging liquid is distributed to the clay in the pug mill.

Describing the parts in the said drawing by reference characters, 1 indicates a pug mill of the usual construction, the same being provided with a chute 2 by which clay is fed thereinto. 3 denotes a pipe through which the pugging water is delivered into the distributing receptacle 4, which receptacle extends transversely across the end of the mill, adjacent to the chute 2, and is provided in its bottom with apertures 5 arranged to distribute liquid therefrom evenly across the clay therebelow. The pipe 3 is provided with a valve 6, by means of which and a scale 7 the supply of water to the receptacle 4 may be accurately proportioned.

8 denotes a tank to which water is delivered from a float tank 9, and 10 a pipe extending from the float tank into the former tank. Water for the float tank is supplied through a pipe 11 having its delivery end 11a projecting upwardly through the bottom of the tank and there provided with an upwardly seating valve, the casing whereof is indicated at 12, the said valve being operated by means of a float 13 and an arm 14 connected to the valve stem 15 and pivotally connected at the end opposite the float to a projection 12a on the casing. The valve and the float may be of any ordinary or standard type and need no further detailed description. It will be observed that the float tank 9 maintains a liquid level in the tank 8 above the perforations in the container 16. The tank 9 is provided in the top with a vent 9a.

Extending through the top of the tank 8 and to the bottom thereof is a container 16, the lower portion of the container being perforated, as indicated at 16a and the top of the container being provided with a cover 17. 18 denotes a steam pipe which extends through the side of the tank 8 and communicates with or is formed into a coil 19 therein. This pipe is provided with an ordinary hand-operated valve 20 and a valve 21 which is adapted to be operated by a thermostat 22 which, through the wires 23, 24 and 24a, controls the current applied to a motor within the casing 25 through the line wires A and B in such manner as to operate the motor (not shown) to cause it to open and close the valve 21 in accordance with the temperature in the tank. Thermostatic apparatus for operating motors in the manner described are well known to those skilled in the art, instances being the so-called "Honeywell" thermostat and the "Regitherm" thermostat; hence detailed description of the thermostat and motor is unnecessary. From the pipe 18 pipes 26 and 27 are adapted to deliver steam through a valve 28 into a coil 29 in the tank 9. The pipe 27 may also communicate with the pipe 18 at a point between the valve 21 and the tank 8 through a valve 30.

31 denotes a pipe for live steam which is adapted to be placed in communication with the perforated part of the container 16 by a vertical branch 32 and a distributing head 33 in the said container. The branch 32 is provided with a valve 34.

Beyond the branch 32, the pipe 31 is extended upwardly through the bottom of the tank 8 and is there bent into gooseneck form, as indicated at 35, the end of the pipe terminating in a nozzle which is directed into a funnel 37 at the upper end of a pipe 36, the lower end of which pipe delivers into the distributing receptacle 4. The part of the pipe 31 beyond the branch 32 is provided with a valve 31a; and the pipe 36 is provided with a valve 38, by means of which and a scale 39, the proportion of liquid supplied through the pipe 36 to the distributing receptacle 4 may be accurately determined.

With the parts constructed and arranged as described, the operation will be as follows:— The receptacle 16 will be filled with barium hydrate, indicated at C. The water for dissolving these crystals will be supplied through the pipe 11 into the tank 9 where, being heated by the steam supplied through the coil 29 and pipes 18, 26 and 27, any carbon dioxide therein will be driven off through the vent 9a and the water, thus freed of carbon dioxide, will be delivered into the tank 8, the level of the liquid being maintained in the latter tank by means of the float 13. The water in the tank 8 may be heated additionally by steam supplied through the pipe 18 and valves 20 and 21 to the coil 19. The temperature at which this water shall be maintained will be controlled by the thermostat 22 operating the valve 21 in a well known manner.

The purpose of maintaining the water at a predetermined temperature in the tank 8 is to facilitate the production of a solution of standard strength. A temperature of from 105° F. to 175° F. will ordinarily suffice to expel the carbon dioxide from the water in the tank 9 and will facilitate the solution of the barium hydrate in the tank 8. By heating the water to a higher temperature the carbon dioxide will be expelled more quickly in the tank 9 and a more concentrated solution of barium hydrate will be produced in the tank 8. The purpose of driving off carbon dioxide from the water employed for the barium hydrate solution is to prevent the formation of barium carbonate which is difficultly soluble in water. The tank 8 is preferably provided with a vent 8ª through which any carbon dioxide that may be liberated in said tank may escape. The solution in the tank 8 is delivered through the funnel 37, pipe 36, and valve 38 into the distributing receptacle 4, where it is mingled in definite proportions with the pugging water supplied through the pipe 3 and the valve 6. It has been found that a proportion of barium hydrate to the clay employed for the making of brick and tile of from 1/10th to 4 percent of the hydrate to the clay entering the brick will be sufficient to convert all of the soluble sulphates in the clay into insoluble barium sulphate. In a brick clay containing, say calcium sulphate and magnesium sulphate, which are two of the most common scum-producing constituents in present brick clays, the barium hydrate will act as follows:

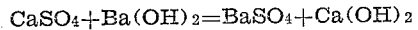

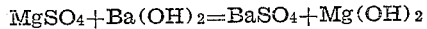

Should the apertures 16ª become clogged, as by an accumulation of barium hydrate re-crystallizing after solution, live steam can be supplied to the interior of the receptacle 16 through the pipes 31 and 32 and the distributer 33. This steam will raise the temperature of the water in the vicinity of the said receptacle to a point which will effect speedy solution of the crystals, thus enabling the operation to proceed. In like manner, should the funnel 37 be clogged by an accumulation of such crystals, live steam supplied through the gooseneck 35 will dissolve the crystals quickly, and the apparatus may thereafter function in its usual manner.

By virtue of the valves 6 and 38 and the scales 7 and 39, the proportions of barium hydrate solution and pugging water can be accurately proportioned so that the requisite amount of barium hydrate to convert the soluble sulphates into insoluble barium sulphate may be incorporated with the pugging water directly into the clay in the pug mill.

The apparatus herein is capable of continuous operation, the solution of barium hydrate of desired strength being produced continuously in the tank 8 and being supplied continuously therefrom at a definite rate to the distributing box or receptacle 4.

If desired, a small jet of live steam may be supplied continuously to the funnel 37 to superheat the solution fed through the pipe 36.

Having thus described our invention, what we claim is:—

1. In an apparatus for the production of a solution for admixture with clay, the combination of a liquid containing tank, means for supplying liquid thereto, a container for a soluble chemical compound in said tank and having perforations for the admission of the liquid in said tank to the compound in said container, means for heating the liquid in said tank, the said tank having an outlet for supplying the solution therefrom for admixture with the clay, and means for supplying compressed gaseous material to said outlet.

2. In an apparatus for the production of a solution for admixture with clay, the combination of a liquid containing tank, means for supplying liquid to said tank, a container for a soluble chemical compound in said tank and having perforations for the admission of the liquid in said tank to the compound in said container, means for maintaining the solution in said tank at a substantially definite temperature, the said tank having an outlet for supplying solution therefrom for admixture with the clay, and means for supplying compressed gaseous material to said outlet.

3. In an apparatus for the production of a solution for admixture with clay, the combination of a tank, a container for a soluble chemical compound extending upwardly from the bottom of said tank and having its lower portion perforated, a float tank, means for supplying liquid to said float tank, means for heating the liquid in said float tank, means for delivering heated liquid from the float tank to the first tank, a heating coil in the first tank, means operative by the temperature of the liquid in the first tank for controlling the supply of fluid to the said coil, and means for delivering the solution formed in the first tank at a definite rate for admixture with the clay.

4. In an apparatus for the production of a solution for admixture with clay, the combination of a tank, a container for a soluble chemical compound within the said tank and having perforations for the admission of the liquid in said tank to the compound in said container, a float tank, means for supplying liquid to said float tank, means for heating the liquid in said float tank, means for delivering heated liquid from the float tank to the first tank, a heating coil in the first tank adapted to heat the contents thereof by means of heated fluid, means operative by the temperature of the liquid in the first tank for controlling the supply of fluid to the said coil, means including a pipe for delivering solution from the first tank at a definite rate for admixture with the clay and means for supplying compressed gaseous material to said pipe.

5. In an apparatus of the character described, the combination of a tank, a container for a soluble compound extending upwardly from the bottom of said tank and having its lower portion perforated, means for supplying liquid to and maintaining the same at a level in said tank above the perforated portion of said container, a coil in said tank, means for supplying steam to said coil, means operated by variations in the temperature of the liquid in said tank for controlling the supply of steam to said coil, and means for delivering the solution from the said tank at a definite rate.

WILLIAM R. JEAVONS.
MAHLON J. RENTSCHLER.